(12) United States Patent
Glennon et al.

(10) Patent No.: US 11,284,311 B2
(45) Date of Patent: Mar. 22, 2022

(54) SYSTEMS AND METHODS FOR RADIO ACCESS NETWORK SMALL CELL

(71) Applicant: CABLE TELEVISION LABORATORIES, INC, Louisville, CO (US)

(72) Inventors: Stephen Glennon, Lafayette, CO (US); Luis Alberto Campos, Superior, CO (US); Mario Di Dio, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 77 days.

(21) Appl. No.: 16/592,654

(22) Filed: Oct. 3, 2019

(65) Prior Publication Data

US 2020/0112888 A1 Apr. 9, 2020

Related U.S. Application Data

(60) Provisional application No. 62/740,685, filed on Oct. 3, 2018.

(51) Int. Cl.
*H04W 4/00* (2018.01)
*H04W 36/00* (2009.01)
(Continued)

(52) U.S. Cl.
CPC ........ *H04W 36/0022* (2013.01); *H04B 1/401* (2013.01); *H04L 12/6418* (2013.01);
(Continued)

(58) Field of Classification Search
CPC ........... H04W 36/0022; H04W 36/385; H04W 88/08; H04B 1/401; H04L 12/6418; H04L 2012/6421
(Continued)

(56) References Cited

U.S. PATENT DOCUMENTS 9,668,263 B1 * 5/2017 Tkach ................... H04L 47/225
2003/0061422 A1 * 3/2003 Repice ................... H04W 92/20
710/107

(Continued)

OTHER PUBLICATIONS

Hiroaki Arai et al. (Fixed wireless Systems with Large Transmission Capacity for Entrance Circuits, NTT DoCoMo Technical Journal vol. 7 No. 2) (Year: 2005).*

*Primary Examiner* — Maharishi V Khirodhar
(74) *Attorney, Agent, or Firm* — Armstrong Teasdale LLP

(57) ABSTRACT

A radio access network (RAN) node is provided for a small cell of a wireless access network having a coaxial line. The RAN node includes an input operably coupled with the coaxial line and an output configured to wirelessly communicate with at least one user equipment device within an operable vicinity of the wireless access network. The RAN node further includes a transmission path configured to (i) connect the input to the output, and (ii) communicate a first radio frequency (RF) signal from the input to the output, and a reception path separate from the transmission path, and configured to (i) connect the output to the input, and (ii) communicate a second radio frequency (RF) signal from the output to the input. The RAN node is configured to dynamically switch between the transmission path and the reception path in response to a tone received from the wireless access network.

15 Claims, 4 Drawing Sheets

(51) Int. Cl.
  *H04W 36/38* (2009.01)
  *H04B 1/401* (2015.01)
  *H04L 12/64* (2006.01)
  *H04W 88/08* (2009.01)
(52) U.S. Cl.
  CPC ......... *H04W 36/385* (2013.01); *H04W 88/08* (2013.01); *H04L 2012/6421* (2013.01)
(58) Field of Classification Search
  USPC ....................................................... 370/331
  See application file for complete search history.

(56) References Cited

U.S. PATENT DOCUMENTS

| | | | | |
|---|---|---|---|---|
| 2004/0117426 | A1* | 6/2004 | Rudkin | H04L 65/605 709/200 |
| 2009/0227203 | A1* | 9/2009 | Guerreri | H04B 1/0096 455/39 |
| 2012/0257516 | A1* | 10/2012 | Pazhyannur | H04B 7/024 370/252 |
| 2013/0051329 | A1* | 2/2013 | Take | H04W 80/02 370/328 |
| 2013/0094554 | A1* | 4/2013 | Kennard | H04J 1/20 375/222 |
| 2014/0364129 | A1* | 12/2014 | Xiao | H04W 36/0085 455/444 |
| 2017/0176690 | A1* | 6/2017 | Bretz | G02B 6/3817 |
| 2017/0265106 | A1* | 9/2017 | Andreoli-Fang | H04W 72/1268 |
| 2017/0294930 | A1* | 10/2017 | Langbein | H04B 1/48 |
| 2018/0103466 | A1* | 4/2018 | Andreoli-Fang | H04L 5/0094 |
| 2018/0270103 | A1* | 9/2018 | Chapman | H04L 41/06 |
| 2018/0294881 | A1* | 10/2018 | Shibata | H04J 11/00 |
| 2020/0028639 | A1* | 1/2020 | Lindqvist | H04L 1/0023 |
| 2020/0045627 | A1* | 2/2020 | Wolfe | H04L 5/0092 |
| 2021/0057802 | A1* | 2/2021 | Guri | H01Q 1/246 |

* cited by examiner

SYSTEMS AND METHODS FOR RADIO ACCESS NETWORK SMALL CELL

CROSS REFERENCE TO RELATED APPLICATIONS

This application claims the benefit of and priority to U.S. Provisional Patent Application Ser. No. 62/740,685, filed Oct. 3, 2018, which is incorporated herein by reference in its entirety.

BACKGROUND

The field of the disclosure relates generally to communication networks, and more particularly, to small cell placement and management within a radio access network.

Conventional communication systems include wired networks (e.g., cable, fiber optic, hybrid fiber coaxial (HFC), etc.) and wireless technologies (e.g., Wi-Fi, Bluetooth, Zigbee, Long Term Evolution (LTE), etc.). Some HFC networks include Wi-Fi and/or small cell LTE within the communication system of the network. However, the increasing demand for greater wireless data traffic from small cell installations within a maximum power transmission region of a macro cell, or a macro base station (Macro BS), within the operational vicinity of an HFC network has proven to be costly. Outdoor small cells have been deployed on telephone poles and lines, and indoor small cells have been deployed at or inside individual end user locations (e.g., homes, businesses, etc.). The cost of both deployments is often prohibitive for the amount of coverage increase, and unless the number of small cells near the macro cell saturates the coverage region, service availability for mobile users (e.g., user equipment, such as smart phones, intelligent vehicles, etc.) may be unreliable.

FIG. 1 is a schematic illustration of a conventional cable network 100 operating within the vicinity of a macro cell 102 (e.g., a transmitting portion of a wireless LTE mobile network operator (MNO)). In the example depicted in FIG. 1, network 100 is illustrated as an HFC network operable to provide video, voice, and data services from a headend or hub 104 to a plurality of end point subscriber locations 106 (e.g., customer premises equipment (CPE)) as a wireless regional access network. Headend/hub 104 may include a converged cable access platform (CCAP) 108, and an optical transceiver 110 in operable communication with a plurality of fibers 112. Headend/hub 104 may include a plurality of headends and/or hubs connected over an optical link (not shown), and may receive data transmissions from one or more of a plurality of earth stations/satellite dishes, the Internet, and the public switched telephone network (PSTN).

Network 100 may further include a plurality of amplifiers/deep nodes 114 disposed along cable or coaxial lines 116 (e.g., trunk cables), and a plurality of fiber nodes 118 connected to fibers 112 for the optical passage of data therebetween. A plurality of taps 120 are disposed along drop cables 122 extending from amplifiers 114, through which end points/CPEs 106 and fiber nodes 118 may operably access and communicate with hub 104 over network 100. Network 100 further includes a plurality of small cells 124 that are configured (e.g., using transmission-capable antennas) to also access or communicate with hub 104 at respective taps 120. For ease of explanation, some taps 120 are shown with no connections, while others are shown connected to CPEs 106 or small cells 124. Small cells 124 may be further configured to wirelessly communicate with one or more user equipment devices (UEs, not shown in FIG. 1, described further below with respect to FIG. 3) within their respective radio frequency (RF) transmission range, and may include one or more of a wireless access base station (e.g., an eNodeB or a gNodeB) and a Wi-Fi access point (AP).

In some conventional implementations of network 100, small cell 124 represents a conventional base station, or remote radio head/unit (RRH/RRU), where all functions are implemented at the site of the RRU small cell. The transport facility of this case of implementation is referred to as the "backhaul," which has been conventionally popular because the throughput and latency are minimized due to the performance of essentially all processing at the radio site. In the case where network 100 implements at least a fourth-generation (4G and beyond) infrastructure, network 100 may be considered to employ a Fiber-to-the-Antenna (FTTA) architecture; in the case where network conforms to the fifth-generation new radio (5G NR) standard, the interface between the base station/small cell 124 and a core network (not shown in FIG. 1) is referred to as an "NG" interface. The backhaul options for the NG interface include dedicated fiber, wavelength division multiplexing (WDM), passive optical networks (PONs), Data over Cable Service Interface Specification (DOCSIS), and microwave radio.

Conventional multiple system operators (MSOs) have been able to leverage their existing cable infrastructures, and in particular aerial plants, to quickly deploy small cells in targeted areas. Deploying small cells on aerial plant addresses three key challenges with small cell deployments: site access, backhaul, and power. That is, access is often available using existing pole-line attachments and attachment agreements, where both backhaul and power are available to the coaxial cable plant (e.g., strand-mount 4G/LTE-A small cells installed on aerial cable/power line strands with inter-site distances ranging from 175 to 225 meters). The ability to use the HFC cable plant for small cell deployments thus provides power in addition to backhaul connectivity, whereas PON implementations require a separate power service to be installed, thereby adding further costs, time, and complexity to the installation.

Nevertheless, present small cells typically have a very limited effective range (e.g., a radius of approximately 100 m), which is the case for small cells operating within the 2.0-3.5 GHz bands, and particularly so for mmWave bands. Thus, even using the relatively less expensive HFC implementation (i.e., in comparison with PON), at present, it is financially infeasible to deploy small cells every 100-200 m because site access, power, and backhaul are still limited. For the expected near-future wireless traffic demands, a large and densely spaced number of small cells will be needed to gain significant coverage and aggregate throughput. A typical small cell, for example, may presently cost $1500-$3000 for an outdoor unit, and may require an additional expense outlay in the range of tens of thousands of dollars to deliver the needed fiber or coaxial backhaul. Furthermore, in the case of a coaxial backhaul, the small cell unit must also bear the additional cost of a DOCSIS modem, and in the case of 5G small cell deployments, RF coverage requirements have been an even greater challenge.

More specifically, despite the fact that 5G has opened up many new use cases, the 5G paradigm has also generated a number of significant challenges with respect to network densification and small cells. That is, to realize the higher data rates and area traffic capacities promised by 5G, operators need to be deploying much denser network topologies using small cells. One conventional small cell distribution scheme is described further below with respect to FIG. 2.

FIG. 2 is a schematic illustration depicting a conventional distribution scheme 200 for small cells 124 operating within the vicinity of macro cell 102, FIG. 1. As illustrated in FIG. 2, macro cell 102 is shown to have a maximum coverage area 202 corresponding to an approximately circular boundary around macro cell having a transmission radius $R_m$ (e.g., high power, approximately 1-30 km). Within maximum coverage area 202, a plurality of small cell base stations 124 are densely disposed, and shown to have small cell coverage areas 204 of roughly circular shape about a small cell radius $r_s$ (e.g., low power, approximately 100 m). Because small cell coverage areas 204 are roughly circular, individual small cell base stations 124 must be densely packed within maximum coverage area 202 such that no gaps appear between adjacent small cell coverage areas 204.

At present, there are a number of structural and design proposals to radically change the physical network layout (e.g., network 100, FIG. 1), for example, through a re-architecture of the split between baseband unit (BBU) and the radio access networks (RANs) with which they are employed. Examples of such proposed designs include without limitation extensible Radio Access Network (xRAN), Telecom Infra Project (TIP), and others. Moreover, present conventional interfaces between the BBU and the RAN are typically fiber-based, which implicitly requires the need for custom fiber to each small cell site for the fronthaul or backhaul.

FIG. 3 is a schematic illustration depicting a conventional fiber backhaul service 300 for an outdoor small cell 302 (e.g., small cell 124, FIG. 1). In the example illustrated in FIG. 3, backhaul service 300 includes a hub 302 (e.g., similar to hub 104, FIG. 1) having a CCAP 304, and operably connected to first fiber strand 306(1) and second fiber strand 306(2) at upstream ends thereof. Hub 302 or CCAP 304 may further include a modem termination system (MTS, not shown in FIG. 3) for connecting with fiber strands 306, which may be single mode optical fibers (SMFs), or may include dedicated fiber strands for each of the upstream and downstream transmission directions. A downstream end of first fiber strand 306(1) operably connects with a small cell 308 (e.g., a full stack small cell). That is, different from the backhaul in network 100, FIG. 1, in this example, backhaul service 300 connects small cell 308 to hub 302 over a fiber link, as opposed to through a cable drop-to-fiber link.

Additionally, a downstream end of second fiber strand 306(2) operably connects with a fiber node 310, which in turn is in operable communication with an end user 312 (e.g., a modem or CPE thereof, not separately shown in FIG. 3) through a coaxial line 314. A plurality of amplifiers 316 (e.g., 1-N) are disposed along a length of coaxial line 314 (e.g., trunk and/or drop cable). In operation of backhaul service 300, a first UE 318(1) is disposed at a relatively fixed location within the premises of end user 312, and configured for wireless communication with small cell 308. A second UE 318(2) is represented as a mobile wireless device, without a fixed location with respect to small cell 308, but is nevertheless operable within a transmission range of small cell 308. The person of ordinary skill in the art will understand that other small cells may also transmit within range of UE 318(2), but the present example is intended for ease of explanation, and not in a limiting sense. For example, the present discussion is not meant to describe specifics of potential handoffs between small cells.]

In operation, one or both of UEs 318 wirelessly communicate with small cell 308 using wireless backhaul service 300 to secure the necessary backhaul connectivity (or transport) from small cell 308 to a core network (not shown in FIG. 3). As described above, such transport solutions include dedicated fiber, WDM, PONs, DOCSIS, and microwave radio, among others. The transport selection may be required by the network, or may be dependent on such factors as accessibility, technical performance, immediacy of deployment, capacity, and cost. Conventional macro cell backhaul systems have relied primarily on dedicated fiber and microwave radio. With the introduction of 4G small cells, however, DOCSIS 3.1 is becoming a more common implementation for backhaul traffic from both indoor and outdoor small cells. In these cases up to 5 small cells can usually be served by a single cable modem.

However, as many of these conventional proposals have moved away from analog and coaxial solutions, the increasing small cell deployment challenges have not considered solutions that integrate coaxial technologies for analog fronthaul. DOCSIS-based non-ideal fronthaul solutions have proven useful from a technological standpoint, but these advanced technology approaches nevertheless suffer from significant cost disadvantages, and particularly with respect to the analog, coaxial-based solutions described below.

Accordingly, it is desirable to find less costly solutions to increase small cell density deployment in existing and upcoming RAN installations.

BRIEF SUMMARY

In an embodiment, a radio access network (RAN) node is provided for a small cell of a wireless access network having a coaxial line. The RAN node includes an input operably coupled with the coaxial line and an output configured to wirelessly communicate with at least one user equipment device within an operable vicinity of the wireless access network. The RAN node further includes a transmission path configured to (i) connect the input to the output, and (ii) communicate a first radio frequency (RF) signal from the input to the output, and a reception path separate from the transmission path, and configured to (i) connect the output to the input, and (ii) communicate a second radio frequency (RF) signal from the output to the input. The RAN node is configured to dynamically switch between the transmission path and the reception path in response to a tone received from the wireless access network.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
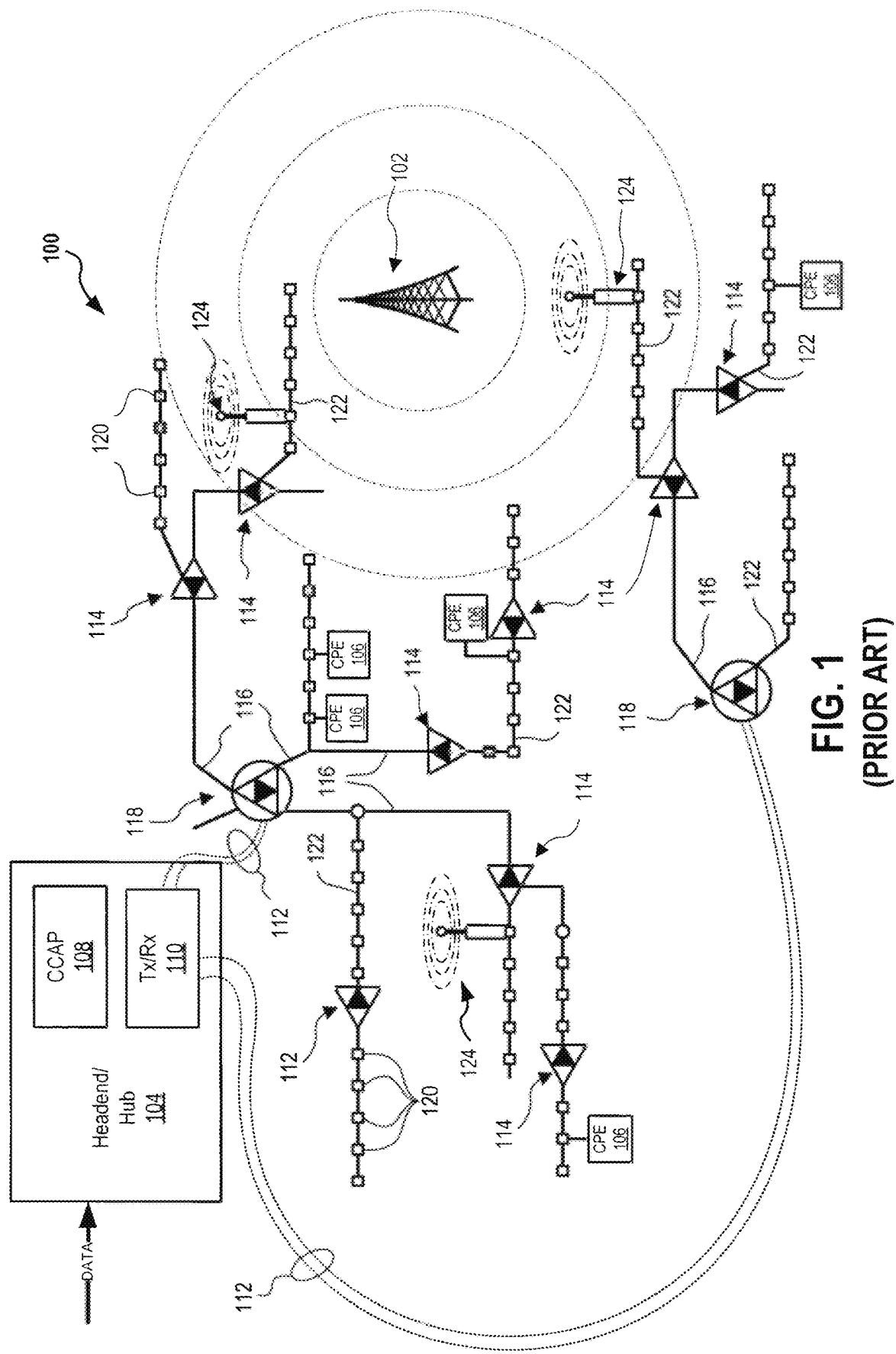
FIG. 1 is a schematic illustration of a conventional cable network 100 operating within the vicinity of a macro cell.
Figure 2:
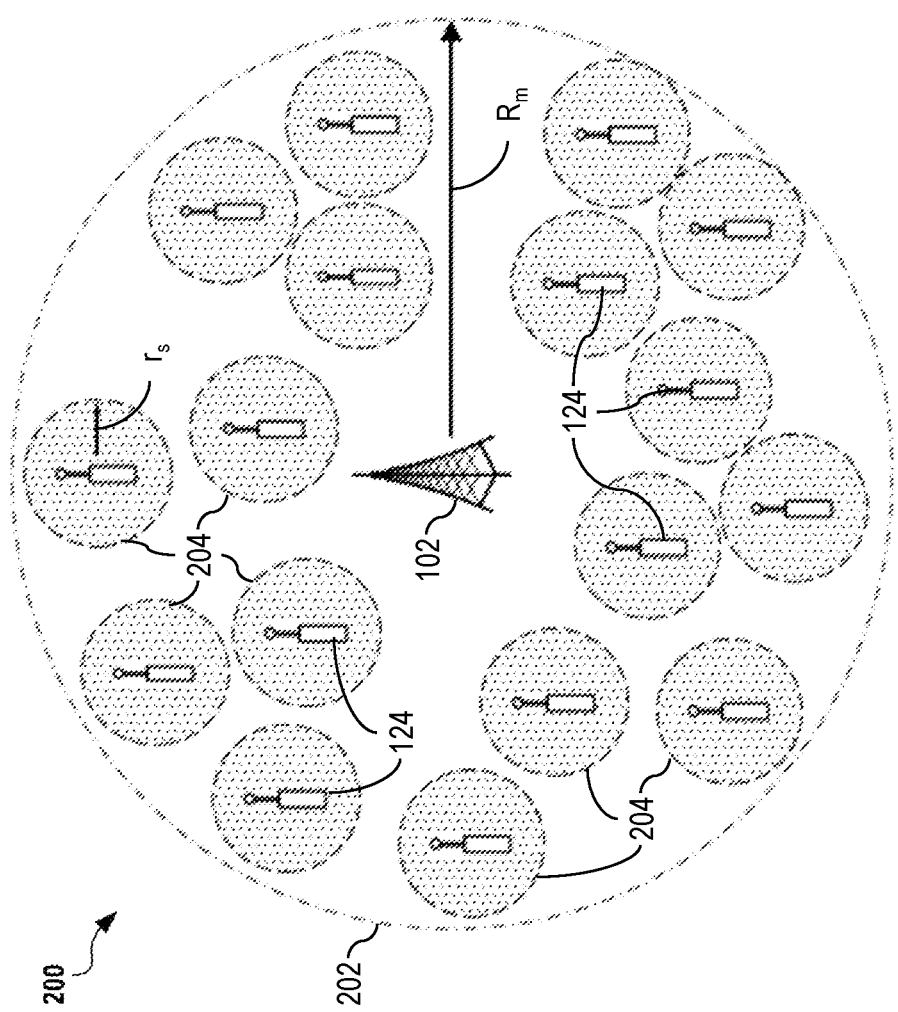
FIG. 2 is a schematic illustration depicting a conventional distribution scheme for small cells operating within the vicinity of the macro cell depicted in FIG. 1.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As described herein, the phrase "user equipment" includes an electronic device or system utilizing an aggressive, non-cooperative technology protocol, such as LTE-U, and may include one or more of a radio terminal, cell phone, a laptop computer, a tablet computer, a wearable device, an Internet of Things (IoT) device, and a wireless equipped motor vehicle. The phrase "Wi-Fi device" includes an electronic device, such as a station or STA, which has the capability to use one of the existing 802.11 protocols. For example, a Wi-Fi device can include, without limitation, one or more of a laptop computer, a desktop personal computer (PC), personal digital assistant (PDA), an AP, and a Wi-Fi phone/smartphone. The Wi-Fi device may be fixed, mobile, or portable, and includes a transceiver or transmitter/receiver combination, an 802.11-conformant media access control (MAC) and physical layer (PHY) interface to a wireless medium (WM).

As used herein, the phrase "wireless communication protocol" may refer to one or more cooperative or non-cooperative wireless protocols, including without limitation the 802.11, Wi-Fi, 3G, 4G, 5G, Next Generation (NG), Bluetooth, Zigbee, Long Term Evolution (LTE), and unlicensed LTE (LTE-U) communication protocols.

The following description features processes and systems for utilizing primarily analog technology to more inexpensively distribute small cells throughout existing RAN systems to significantly increase the small cell density within the RAN, but without significantly increasing the deployment cost in a proportional manner. In an exemplary embodiment, a primary small cell is deployed, for example, at a conventional network node location, and secondary, incremental small cells are disposed periodically at or within taps located between the primary small cell site and an end user. In the exemplary embodiment, the primary small cell may include an eNodeB or a gNodeB, whereas the secondary small cells will be of substantially analog construction.

According to the embodiments described herein, a distributed small cell is deployed through innovative techniques of housing the radio head(s) in existing cable taps (e.g., in a drop cable). In some embodiments, the BBU may reside at the HFC fiber node, or higher, in the network. Through these advantageous systems and methods, the present embodiments may utilize intermediate frequency distribution of a 5G/LTE signal over the cable plant, and existing power amplifiers powered from a rigid coaxial 90V AC power supply, but inexpensive filtering and up/down conversion at or within the tap. The present techniques are estimated to cost approximately $30 for each incremental secondary small cell site, plus the cost of installation labor, which is considerably less than the $1500-$3000 cost of a new primary small cell site. The cost of a secondary site may increase slightly, but not prohibitively, in the case where an additional power insertion is desired with respect to a specific node or geography.

The present systems and methods thus effectively realize a low-complexity, low-cost distributed radio head that has a bill of materials of approximately $45 in small quantities, but below $30 for each secondary small cell when purchased in volume. The present techniques thus enable an operator to deploy 5G-NR and LTE small cells much less expensively (i.e., at least 1-2 orders of magnitude less) than would be required for a platform containing a DOCSIS cable modem in addition to the eNodeB or gNodeB.

In the exemplary embodiment, the construction of the present secondary small cells is primarily analog, and may take the form of a substantially hardware implementation. The person of ordinary skill in the art, however, will understand that many of the individual elements of the present embodiments may be substituted by software implementations, or by combinations of hardware and software elements, without departing from the scope herein. Embodiments utilizing network functions virtualization (NFV) and virtualized hardware, such as a virtualized MTS, virtualized modem, virtualized aspects of the MTS and/or modem, etc., are also contemplated. In at least one embodiment, the present systems and methods implemented software including firmware, resident software, microcode, etc.

Figure 4:
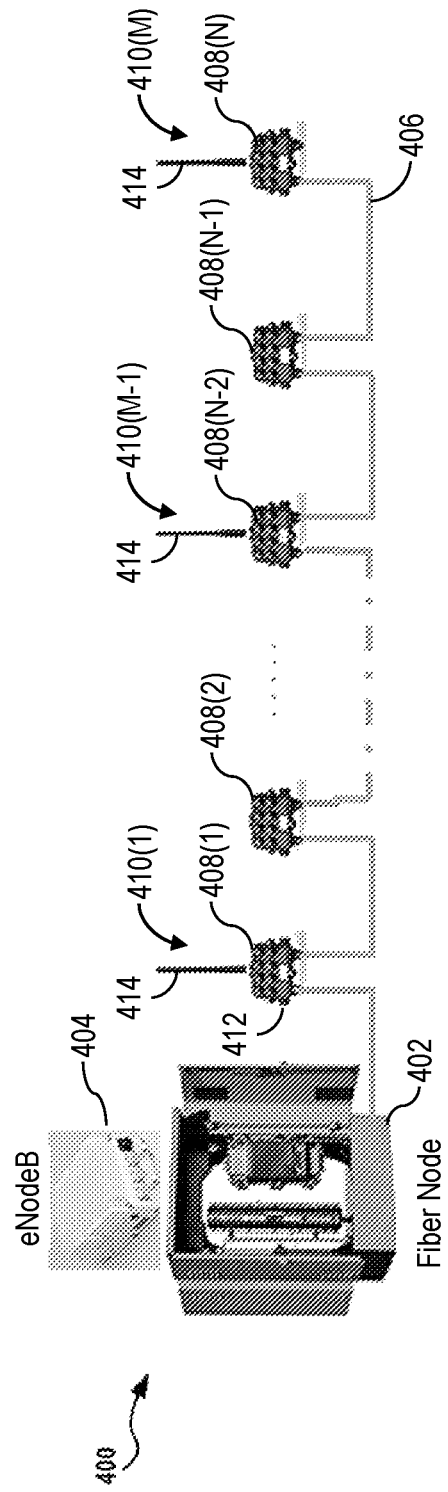
FIG. 4 is a schematic illustration depicting an exemplary distributed radio access network node deployment architecture, in accordance with an embodiment.

FIG. 4 is a schematic illustration depicting an exemplary distributed RAN node deployment architecture 400. In an exemplary embodiment, deployment architecture 400 includes a fiber node 402. In the example depicted in FIG. 4, fiber node 402 includes in eNodeB 404 (or gNodeB) disposed thereat or therein. Fiber node 402 connects to a main distribution coaxial line 406 (e.g., a trunk cable), along which are disposed a plurality of taps 408 (i.e., 1-n taps 408, in this example). In the exemplary embodiment, deployment architecture 400 further includes a plurality of secondary RAN nodes 410 distributed at or within respective taps 408. In the exemplary embodiment depicted in FIG. 4, secondary RAN nodes 410 are distributed at every other tap 408 (odd-numbered taps 408, in this example). Accordingly, in this example, deployment architecture 400 includes 1-m secondary RAN nodes 410, where m=n/2, if n is an even number, and where m=(n±1)/2, if n is an odd number.

In an exemplary embodiment, secondary RAN nodes 410 are architecturally configured to attach to respective faceplates 412 of respective taps 408, and each secondary RAN node 410 includes at least one wireless antenna 414 configured to enable wireless communication with one or more UEs (not shown in FIG. 4). In exemplary operation of deployment architecture 400, eNodeB/gNodeB 404 may still be included in the respective network (e.g., network 100, FIG. 1). However, according to the embodiments herein, implementation of eNodeB/gNodeB 404 may advantageously be at the level of fiber node 402. According to this configuration, the cost of the network will thereby scale at a significantly lower rate than it would according to the conventional technique of deploying full small cells in the outdoor physical locations or indoor residential locations described above.

In some embodiments, deployment architecture 400 is implemented with respect to a network utilizing frequency division duplexing (FDD) such as microwave, mmWave, and some 4G/LTE networks. However, as discussed above, these types of networks require significantly greater numbers of closely-spaced small cells. Accordingly, the present embodiments provide additional solutions for enabling a time division duplexing (TDD) network to implement the secondary RAN node deployment techniques herein, and according to a similar cost structure. As described further below with respect to FIG. 5, deployment architecture 400 may further utilize a tone detector in or with secondary RAN node 410 such that up/down timing may be signaled from the BBU (not shown in FIG. 4) in secondary RAN node 410 and detected for switching of the RAN radio direction at a relatively very low cost in comparison with conventional techniques.

In the exemplary embodiment, this particular TDD-based solution alters the economic model described above such that the hardware cost of the first secondary small cell site (i.e., secondary RAN node 410(1)') will be approximately the same as the FDD-based solution, described above. However, the cost of subsequent secondary small cell sites (i.e., secondary RAN nodes 410(2)'-410(m)') may be close to negligible for those particular nodes, thereby greatly increasing the advantageous economic impact of the present systems and methods with respect to TDD-based solutions.

Figure 3:
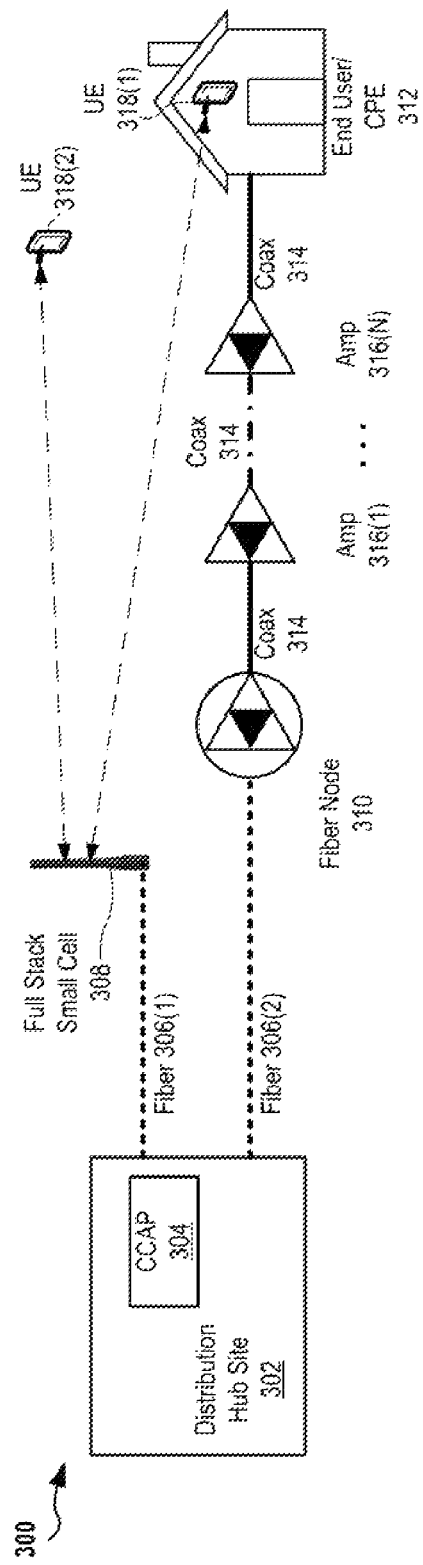
FIG. 3 is a schematic illustration depicting a conventional fiber backhaul service for an outdoor small cell.

According to the exemplary embodiment, the economics of small cells deployment may be significantly changed by effectively splitting the functionality such that the field-installed element (i.e., secondary RAN node 410 at faceplates 412 of tap 408) may be primarily analog in nature, and significantly inexpensive in comparison with a full small cell deployment (e.g., $30-$45 versus $1500-$3000). Such a secondary RAN nodes 410 may further operate at relatively low power (e.g., approximately 4 W), and easily deployed, for example, at every second tap 408 along main distribution coaxial line 406. The greatest economic savings are expected to be realized by maintaining the field-installed secondary RAN node 410 substantially analog, while centralizing the corresponding digital electronics, along with their related functionality, at fiber node 402, or alternatively, at a central hub (e.g., hub 104, FIG. 1, hub 302, FIG. 3).

The present embodiments therefore provide a new financial model for small cell deployment that offers significantly less expensive alternatives to the conventional small cell deployment schemes, thereby greatly improving the capabilities of network operators to increase the network capacity and coverage infill, and particularly with respect to residential and urban scenarios. The present techniques provide still further benefits in that they may be deployed in a complementary fashion alongside conventional full small cell deployments in high-traffic areas.

The present systems and methods therefore represent significant improvements over previous solutions, such as "LTE over Coax" and "LTE Post", which focused on wireless drops and/or replacements of the broadband connection to home. These previous solutions were not economically well modeled for the individual unit cost, and were considered to be merely stop-gap measures to more rapidly provide approximately 1 Gbps data speeds to each residential end user location in the fiber-to-the-home (FTTH) paradigm. In contrast, the present solutions are modeled for both long term and scalable deployment.

In an exemplary embodiment, the present systems and methods are further of particular value in future Node+0 implementations, i.e., architectures in which all amplifiers are removed from the line from the node (e.g., leaving only those amplifiers in the nodes), as opposed to architectures including four or five amplifiers for each coaxial line (e.g., node+4 or node+5, respectively) respectively. As described further below with respect to FIG. 5, the secondary are a node techniques described herein may effectively operate at low power, using only the available AC power from the main coaxial line, or may provide additional power without substantially increasing the bill of materials or cost of deployment.

Figure 5:
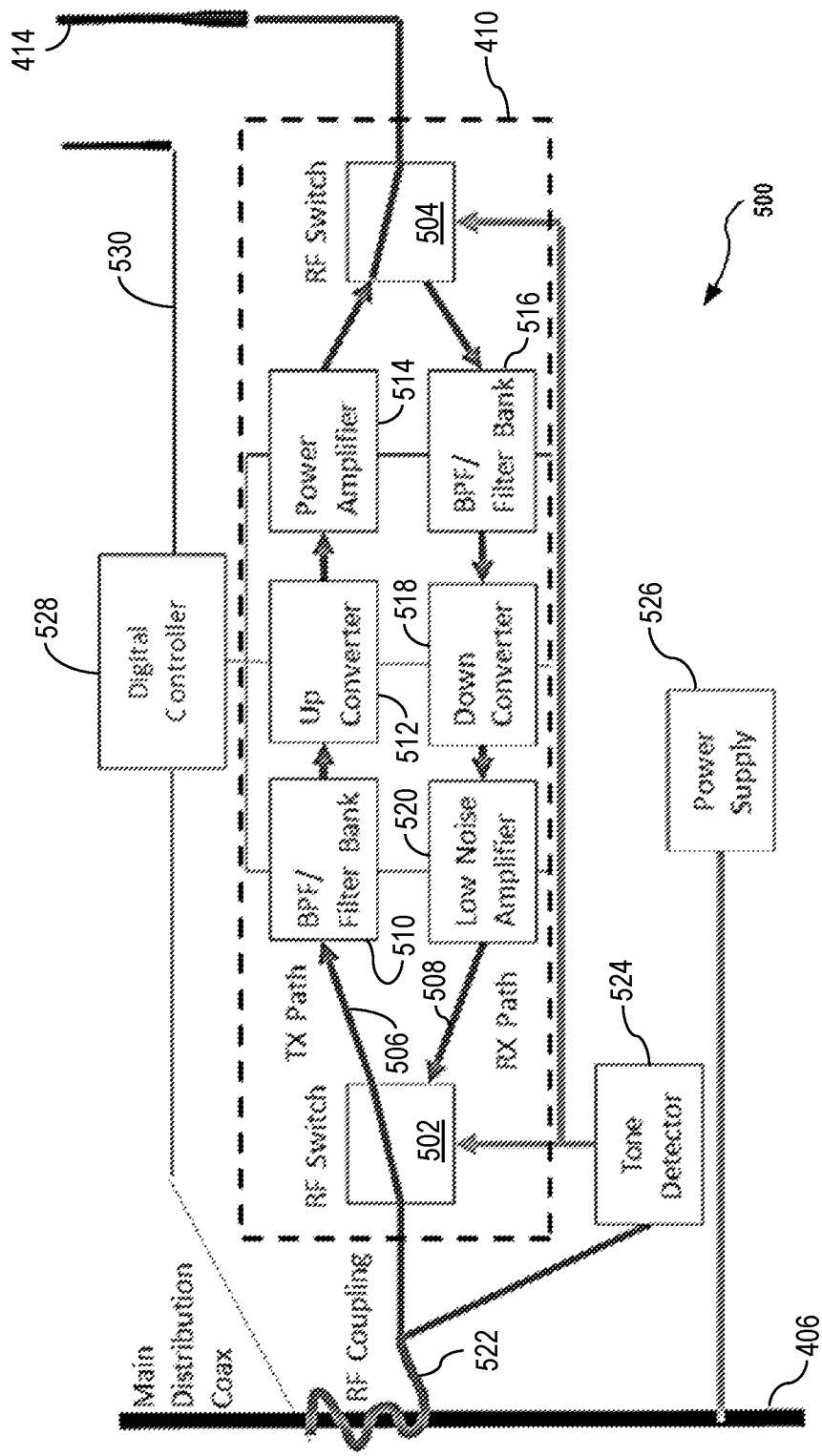
FIG. 5 is a schematic illustration depicting an exemplary block diagram for the secondary radio access network node depicted in FIG. 4.

FIG. 5 is a schematic illustration depicting an exemplary block diagram architecture 500 for secondary RAN node 410, FIG. 4. In the exemplary embodiment depicted in FIG. 5, secondary RAN node 410 is deployed with respect to main distribution coaxial line 406, FIG. 4, and for a TDD network implementation. In an exemplary embodiment, secondary RAN node 410 includes a first RF switch 502 and a second RF switch 504 disposed at respective "input" and "output" of secondary RAN node 410, between which are formed a transmission path 506 and a reception path 508. The person of ordinary skill in the art will understand that the perspective terms "input", "output", "transmission", and "reception" are relative terms that are provided for ease of explanation, and not in a limiting sense. First RF switch 502 and second RF switch 504, for example, both have some input and output capabilities. Similarly, both of paths 506, 508 transmit and receive information from respective switches 502, 504.

According to the labeling convention described immediately above, transmission path 506 includes one or more of a first bandpass filter (BPF) or filter bank 510, an up converter 512, and a power amplifier 514 between first RF switch 502 and second RF switch 504. Similarly, reception path 508 includes one or more of a second BPF/filter bank 516, a down converter 518, and a low noise amplifier (LNA) 520 between second RF switch 504 and first RF switch 502. In an exemplary embodiment, first RF switch 502 connects to main distribution coaxial line 406 through an RF coupling link 522, and second RF switch 504 connects to RAN node antenna 414.

In an exemplary embodiment, in the case where secondary RAN node 410 is deployed with respect to a TDD network implementation, architecture 500 further includes a tone detector 524 in operable communication with first RF switch 502, second RF switch 504, and RF coupling link 522. In some embodiments, tone detector 524 is integral to the structure of secondary RAN node 410. In other embodiments, tone detector 524 is a separate standalone unit, or integral to a separate component that is in operable communication with secondary RAN node 410. In the embodiment depicted in FIG. 5, main distribution coaxial line 406 connects to a main power supply 526 (e.g., 90 V AC). Optionally, architecture 500 may further include an auxiliary power supply (not shown) if desired.

In at least one embodiment, architecture 500 further includes an optional digital controller 528 in operable communication with secondary RAN node 410 (and/or individual components thereof) and main distribution coaxial line 406. Digital controller 528 may further include a wireless link 530, and also implement a communication technology such as Long Range narrowband communication (LoRA). LoRA, for example, is one of a few narrowband communication technologies that is considered alternative to 5G, and which also provides a bridge between LTE and existing 5G implementations.

According to the present embodiments, and advantageous distributed small cell deployment is realized that effectively provides secondary small cells, at respective secondary RAN nodes, from a primary small cell at, for example, a fiber node. These secondary RAN nodes may be completely, or dominantly, analog, and thus may also be referred to herein as analog RAN, or ARAN, nodes. The innovative internal and deployment architectures of the ARAN nodes represent a significant improvement over conventional technologies by eliminating the need for a cable modem in a cable network.

In some embodiments, where desired, functionality that may be conventionally provided by a cable modem, instead may be provided by the present relatively low-cost digital controller (e.g., digital controller 528), which may itself be configured to run LoRA over the coaxial line (e.g., main coaxial line 406) in the upper spectrum (e.g., greater than 2 GHz), or may run LoRA wirelessly over the air, such as by wireless link 530. In some embodiments, digital controller 528 is optional, or alternatively, is implemented only for infrequent re-configuration of channels.

In the case of a TDD-based network limitation, the present ARAN node is advantageously configured to utilize simple tone detection to enable easy TDD switching between transmission and reception, such that the central eNodeB/gNodeB (e.g., eNodeB 404, FIG. 4) "knows" when the transmission/reception switch takes place, and asserts the appropriate tone for tone detector 524. In an exemplary embodiment, the asserted tone may have a relatively low bandwidth, and may be node-scale or sub-node scale.

The significant improvements offered by the present embodiments become even more apparent when considered with respect to economics of scaling. For example, assuming an N+0 implementation, having 50 households passed (HHP), approximately 12 taps, and 6 ARAN nodes for a single eNodeB, at least 25 subscriber households (i.e., end point users) will be covered by the 6 ARANs (plus the single eNodeB). For this example though, the single eNodeB may be configured to support multiple fiber nodes, which will thereby further improve the scalability of the network of this example, since additional drop cables and related taps may be provided for each supported fiber node, as illustrated in FIG. 1, above.

The present ARAN node configurations may utilize precoding support, and thus may also be advantageously deployed in a complementary fashion with multi-user, multiple-input, multiple-output (MU-MIMO, a.k.a. Next-Gen (NG) AC or AC Wave 2) technology implementations, which allow a Wi-Fi router to communicate with multiple devices simultaneously. The deployment cost of the distributed ARAN node small cells may therefore increase somewhat based on number of simultaneous pre-coders that are added to the system. However, this cost increase may be significantly offset by the number of simultaneous transmissions that may then occur on same eNodeB.

This pre-coding support, along with constructive interference techniques, still further enables the present systems and methods to realize significantly improved small cell range and spectral efficiency. For example, in the case of the Enhanced Mobile Broadband (eMBB) use cases defined for 5G, the embodiments herein may advantageously realize an eMBB urban target of 7.8 bps/Hz in the downlink, and 5.4 bps/Hz in the uplink. The present configurations may still further realize, for a 5 MHz channel, 39 Mbps in the downlink, and 27 Mbps in the uplink, along with significant MU-MIMO gains.

Some of the above embodiments are described with respect to existing conventional network tap locations to analyze a comparative footprint of radio coverage for signals in the 2-3.5 GHz, 5 GHz, and mmWave bands. These examples are provided by way of explanation, and not in a limiting sense. Other bands, and other tap deployment architectures, are contemplated that do not depart from the scope of the embodiments herein. For example, the present embodiment may be implemented in cooperation with propagation models for the transmission bands of interest, which may include building information from public or private sources, as well as tap locations from a network operator. Using such information, dynamic propagation models may be further developed to optimize the selection of tap locations for deployment of ARAN nodes.

Accordingly, the present systems and methods advantageously enable the delivery of significantly low-cost small cell sites by leveraging existing network assets (e.g., coaxial lines and tap sites), and then separating a small cell into respective baseband and RRH components, while providing an analog distribution of the signaling between these the BBU and RRH components over the coaxial lines. Initial designs verify the cost of the ARAN nodes to amount to less than approximately $45 per ARAN node in small quantities (i.e., less than 1000), and projected to be less than $30 per ARAN node when mass-produced (for the 3.5 GHz band example).

For the TDD-based networking examples described above, lightweight control using LORA was also assumed for simplicity of explanation, given that such control would be infrequent needed for network configuration. Accordingly, all other signaling in real-time may be assumed to be performed over the coaxial cable. In some embodiments, instead of the radio head being located at a specific tap, the radio head may alternatively be disposed at a remote location that provides better wireless coverage, and then connected to the specific tap by a cable connection. In some instances of this alternative, right of way considerations may first be determined prior to disposition of the remote radio head.

In the case of node+0 network implementations, it is assumed that sufficient downstream+upstream (FDD), and/or bidirectional spectrum (TDD), on the coaxial line is freed to support such use cases. The flexible channel management capabilities of DOCSIS 3.1, as well as full duplex technology, validate these assumptions for at least low-to-moderate throughput and/or spectrum utilization. In the case of very high bandwidth density small cells, traditional fiber or coaxial solutions may be more desirable.

The present systems and methods are thus of particular value for cable operators desiring to expand into full MNOs operating their own mobile network infrastructure, including e/gNodeBs and evolved packet cores (EPCs). The present embodiments are also of significant value to mobile UE users who will realize significantly broader wireless coverage across macro cell regions and beyond. The innovative techniques described herein may still further realize at least a 1% Wi-Fi offload (e.g., 1% of current cellular data) which is estimated to result in savings of hundreds of millions of dollars over the next several years. As the consumer base moves aggressively to unlimited cellular plans, along with the resultant increase of cellular capacity and mobile bandwidth increases, these savings may yet become even more significant.

At present, this capacity growth is driven by technologies including without limitation macro-cellular (e.g., requiring licensed spectrum, vertical real-estate, and macro-cell hardware), unlicensed technologies (e.g., LAA and CBRS), LTE/5G small cells, and Wi-Fi. Except for the significant costs of macro-technologies in existing bands (i.e., sub-2.5 GHz), the other bands contemplated herein (e.g., 3.5 GHz, 5 GHz, mmWave, etc.) are expected to require large numbers of closely spaced small cells, each estimated to cost as much as $2000-$5000, excluding the costs of the major site itself, permitting, power, and back/fronthaul installation, which may amount to as much as $20,000 per site for each full small cell, or $120,000 for small cell coverage over a 50 household area (i.e., 25 households served by the 6 small cells). At these estimates, conventional small cell deployment may cost as much as $4800 per household served, which is not considered an economically viable solution for small cell deployment at this housing density, even considering that each household served may have multiple mobile users.

According to the present systems and methods though, given the same number (i.e., 50/25) households and small cell radio heads (i.e., 6), the total comparative cost would only be approximately $10,000 (e.g., $4000 for the e/gNodeB at the fiber node, $210 for the ARAN node radio heads (i.e., 6 ARAN nodes at $35 each), plus an installation/truck roll cost of approximately $5000 for one node, since the power, site, and fronthaul would already be in place. Compared with the $120,000 cost according to the traditional approach, the present embodiments would realize a $110,000 savings per node, which represents a full order of magnitude. For a telecommunications MSO having as many as 25 million subscriber households, full implementation the present systems and methods could realize as much as 100 billion dollars saved in comparison with a traditional small cell deployment scheme.

Exemplary embodiments of systems and methods for small cell deployment and radio access network nodes are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A radio access network (RAN) node for a small cell of a wireless access network having at least one distribution coaxial line, the RAN node comprising:
   a primary radio head disposed integrally with the RAN node; and
   a secondary radio head disposed remotely from the primary radio head, the secondary radio head including:
      an input operably coupled with the at least one distribution coaxial line;
      an output configured to wirelessly communicate with at least one user equipment device (UE) within an operable vicinity of the wireless access network;
      a transmission path configured to (i) connect the input to the output, and (ii) communicate a first radio frequency (RF) signal from the input to the output; and
      a reception path separate from the transmission path, and configured to (i) connect the output to the input, and (ii) communicate a second radio frequency (RF) signal from the output to the input,
      wherein, the RAN node is configured to dynamically switch between the transmission path and the reception path in response to a tone received from the wireless access network,
      wherein the primary radio head comprises at least one of an eNodeB and a gNodeB, and
      wherein the secondary radio head (i) comprises a substantially analog construction, (ii) is disposed within a cable tap contacting the at least one distribution coaxial line, (iii) is structurally configured to attach to a faceplate of the cable tap, and (iv) includes a radio antenna extending outwardly from the faceplate.

2. The RAN node of claim 1, wherein the at least one distribution coaxial line is a trunk cable.

3. The RAN node of claim 1, wherein the secondary radio head is configured to receive from the at least one distribution coaxial line an intermediate frequency distribution of (i) a long term evolution (LTE) signal, or (ii) a 5G signal.

4. The RAN node of claim 1, further comprising a modem configured to operate according to a data over cable service interface specification (DOCSIS) protocol, and wherein the secondary radio head is disposed remotely from the modem.

5. The RAN node of claim 1, wherein the primary radio head and the secondary radio head together comprise a distributed RAN node architecture.

6. The RAN node of claim 5, wherein the distributed RAN node architecture is configured to utilize frequency division duplexing (FDD).

7. The RAN node of claim 6, wherein the distributed RAN node architecture is further configured to transmit and receive one or more of a microwave, an mmWave, and a 4G signal.

8. The RAN node of claim 1, wherein the primary radio head comprises a baseband unit (BBU).

9. The RAN node of claim 8, wherein the BBU is configured to transmit the tone to the secondary radio head, and wherein the secondary radio head further includes a tone detector configured to receive the tone from the BBU.

10. The RAN node of claim 1, wherein the primary radio head includes a modem termination system (MTS).

11. The RAN node of claim 10, wherein the MTS includes a cable MTS (CMTS).

12. The RAN node of claim 10, wherein the MTS is virtualized.

13. A radio access network (RAN) node for a small cell of a wireless access network having at least one distribution coaxial line, the RAN node comprising:
   a primary radio head disposed integrally with the RAN node; and
   a secondary radio head disposed remotely from the primary radio head, the secondary radio head including:
      an input operably coupled with the at least one distribution coaxial line;
      an output configured to wirelessly communicate with at least one user equipment device (UE) within an operable vicinity of the wireless access network;
      a transmission path configured to (i) connect the input to the output, and (ii) communicate a first radio frequency (RF) signal from the input to the output; and
      a reception path separate from the transmission path, and configured to (i) connect the output to the input, and (ii) communicate a second radio frequency (RF) signal from the output to the input,
      wherein, the RAN node is configured to dynamically switch between the transmission path and the reception path in response to a tone received from the wireless access network,
      wherein the secondary radio head comprises a substantially analog construction, and
      wherein the secondary radio head comprises a plurality of secondary radio heads distributed among a plurality of cable taps, respectively, in contact with the at least one distribution coaxial line.

14. The RAN node of claim 13, wherein at least one cable tap not containing a secondary radio head is disposed along the at least one distribution coaxial line between two different cable taps of the plurality of cable taps each containing a secondary radio head.

15. The RAN node of claim 13, wherein every other cable tap of the plurality of cable taps containing a secondary radio head.

* * * * *